Dec. 15, 1931.  H. A. TALKEN ET AL  1,836,628
TESTING MACHINE
Filed April 26, 1929
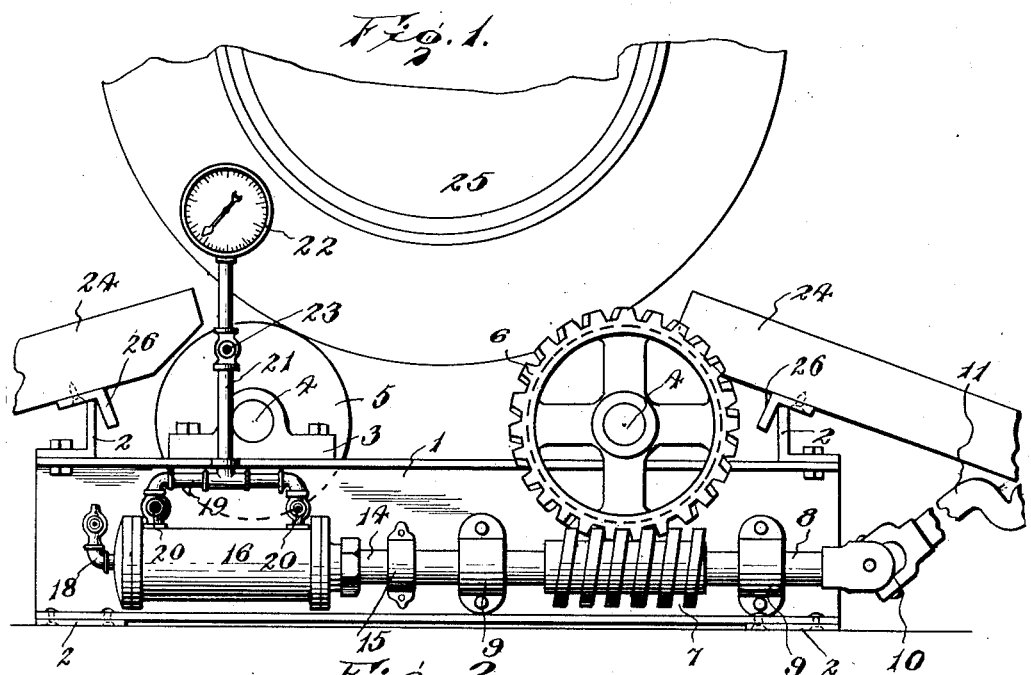
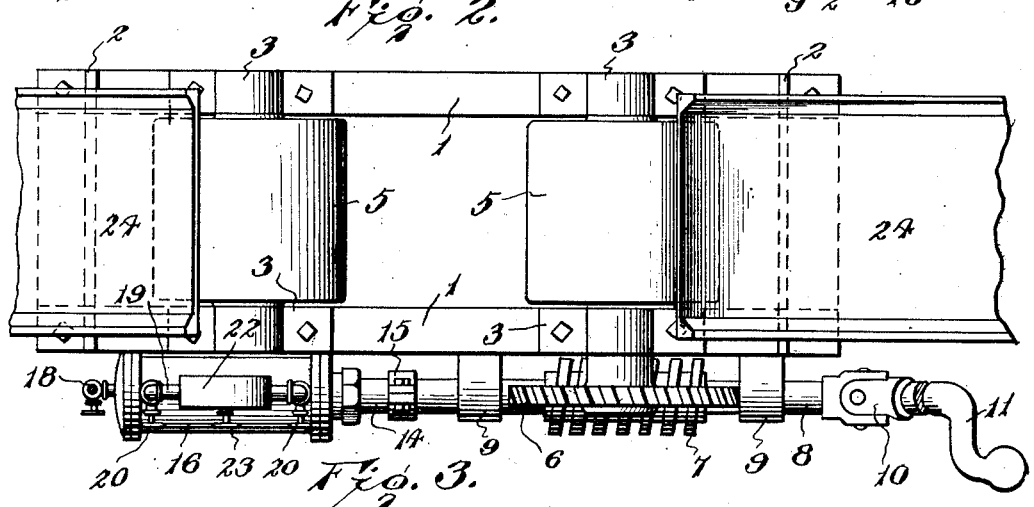
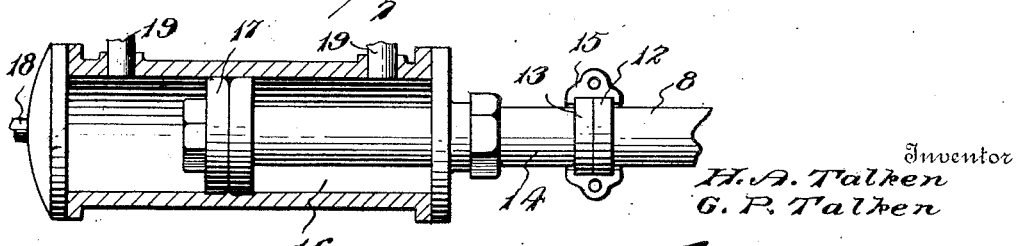
Inventor
H. A. Talken
G. P. Talken
By Lacey & Lacey, Attorneys Patented Dec. 15, 1931                                                                                              1,836,628

UNITED STATES PATENT OFFICE

HARRY A. TALKEN AND GEORGE P. TALKEN, OF CHICO, CALIFORNIA

TESTING MACHINE

Application filed April 26, 1929. Serial No. 358,315.

The object of this invention is to provide a small apparatus which may be easily moved from place to place and by which wheel brakes may be tested or the load imposed upon a rotating element accurately measured. An embodiment of the invention is illustrated in the accompanying drawings and will be hereinafter fully described, the novel features being particularly pointed out in the appended claims.

In the drawings:

Figure 1 is a side elevation of an apparatus embodying the invention,

Fig. 2 is a plan view of the same, and

Fig. 3 is an enlarged detail sectional elevation.

In carrying out the invention, there is provided a base consisting of sills or beams 1 which are preferably metal channel bars of sufficient weight to rest steadily wherever they may be placed. These sills are disposed in parallelism and their ends are rigidly connected as by cross bars 2, the upper ones of which are angle bars. Upon the sills at opposite sides of the centers thereof are mounted bearings 3 in which are journaled the ends of shafts 4, these shafts carrying drums or rollers 5 between the beams, as clearly shown in Fig. 2. One shaft 4 is extended beyond one sill and a worm gear 6 is secured thereon, said worm gear meshing with a worm 7 upon a shaft 8 which is disposed longitudinally of the sills and mounted in bearing brackets 9 secured upon the side of the adjacent sill in any convenient manner. One end of this shaft 8 is connected by a universal joint 10 to an operating crank 11 so that it may be easily rotated whenever the apparatus is to be used. The opposite end of the shaft is formed with an annular flange or head 12 which mates with a similar flange or head 13 on the meeting end of a piston rod 14, a split collar 15 being secured around the two heads whereby to couple the shaft and the piston together in such manner that endwise movement of either will be transmitted to the other while the shaft may rotate without imparting rotation to the piston rod. The piston rod extends into a cylinder 16 and within the cylinder carries a piston head 17, the piston being filled with a liquid at each side of the piston head, and, at the end opposite the end through which the piston rod passes, the cylinder is equipped with a valved vent pipe 18 whereby the pressure therein may be relieved if desired or additional liquid may be supplied if it should be necessary to replenish the supply and compensate for evaporation or possible leakage. Adjacent the opposite ends of the cylinder, the ends of a pipe 19 are fitted into the wall of the cylinder and should have packed joints so as to avoid leakage, a valve 20 being fitted in each end of the pipe so as to control the circulation. Midway the ends of the pipe 19 another pipe 21 is coupled thereinto and this pipe 21 carries a pressure gage 22 which may be of any approved construction. A valve 23 is fitted in the pipe 21, as shown.

There are also provided for use in connection with the apparatus a pair of skids or chutes 24 which may be of any approved form and are intended to be disposed at the opposite ends of the base in alinement therewith with one end resting upon the floor of the testing room and the opposite end resting upon the respective cross bar 2 so that it will be supported in proximity to the rollers 5 and will guide a vehicle wheel onto said rollers. To prevent slipping, cleats 26 are secured upon the under sides of the chutes adjacent their upper ends.

The device is intended more particularly for testing the brakes of automobiles, and in Fig. 1 an automobile wheel 25 is indicated in position to be tested. The automobile is driven up one chute 24 so that the wheel will ride over onto the rollers 5 and be supported by the same. The brake is then applied so that it will hold the wheel against rotation. If the brake fails to hold the wheel, rotation of the rollers 5 will be transmitted to the wheel but if the brake holds the wheel, the rotation of the rollers will not impart rotation to the wheel but the wheel will remain idle until a pressure sufficient to overcome the brake has been exerted thereon. It will be noted that only one of the rollers 5 is an active roller, the roller which is not equipped with a worm gear being merely an idle roller and simply supporting the wheel while it is undergoing the test. With the parts in the position shown in Fig. 1 and the brake set, the crank 11 is rotated so that the shaft 8 will be rotated. Inasmuch as the brake holds the vehicle wheel against rotation, the roller or drum 5 will, of course, be held stationary and the worm gear 6 cannot rotate. The worm 7, however, meshing with the gear is rotated when the crank 11 is rotated and the result is that the worm is caused to travel endwise with respect to the gear so that the piston rod 14 is pushed toward one end of the cylinder 16. The liquid in front of the piston 17 is, consequently, compressed against the end of the cylinder and in the pipes 19 and 21 to act upon the pressure gage 22 and indicate the pressure which is being exerted. Eventually the pressure thus exerted may be greater than the pressure exerted by the wheel brake, whereupon the further endwise movement of the piston will cease and the gear 6 with the corresponding roller or drum 5 will be rotated. The pressure indicated by the gage at the time the brake yields may be noted and if this pressure is lower than that which is required of the brake by existing regulations the brake will be known to be under-standard and will need some repairing. Should the pressure indicated by the gage when the brake yields be equal to or higher than that required of the brake, it will be known that the brake is satisfactory and needs no attention. By properly setting the valves 20, the brake may be tested for its efficiency upon the wheel when the wheel is moving in either direction. The device is easily operated and serves as an effectual test of the brakes. It is obviously capable of measuring a load imposed upon a rotating part and for this purpose it is only necessary to connect the load to be raised or tested to the drum or roller 5 which is connected directly with the worm gear 6 in such a manner that rotation of the roller will tend to move the load. When the pressure indicated in the gage is below the resistance offered by the load, the roller will not rotate but when the pressure has risen above the resistance offered by the load the load will be moved.

Having thus described the invention, we claim:

1. A brake-testing machine comprising a base, transverse rollers mounted on the base to support a wheel with a brake applied, a worm gear fixed to one of said rollers and coaxial therewith, a shaft rotatably and slidably mounted on the side of the base, means for rotating said shaft, a worm on said shaft meshing with the worm gear, a cylinder supported on the base in alinement with said shaft, a piston in said cylinder, a piston rod extending from said piston through the end of the cylinder and coupled to the end of the shaft whereby the shaft may rotate independently of the piston rod but endwise movement of either the shaft or the rod will be imparted to the other, pressure means in the cylinder resisting movement of the piston, and a pressure indicator connected with the cylinder and operated by pressure from the piston.

2. A brake-testing machine comprising a base, transverse rollers mounted on the base to support a wheel with a brake applied, a worm gear fixed to one of said rollers and coaxial therewith, a shaft rotatably and slidably mounted on the side of the base, means for rotating said shaft, a worm on said shaft meshing with the worm gear, a cylinder supported on the base in alinement with said shaft, a piston in said cylinder, a piston rod extending from said piston through the end of the cylinder and coupled to the end of the shaft whereby the shaft may rotate independently of the piston rod but endwise movement of the shaft or the rod will be imparted to the other, circulating pressure means in the cylinder resisting movement of the piston, a pressure gage, a pipe connecting said gage with the ends of the cylinder, and valves in said pipe to control the circulation of the pressure means.

In testimony whereof we affix our signatures.

HARRY A. TALKEN. [L. S.]
GEORGE P. TALKEN. [L. S.]